Nov. 24, 1936.     G. D. SHAEFFER     2,061,853

SLIDE RULE

Filed Nov. 21, 1934

INVENTOR.
George D. Shaeffer
BY
H. S. Babcock
ATTORNEY.

Patented Nov. 24, 1936

2,061,853

UNITED STATES PATENT OFFICE 2,061,853

SLIDE RULE

George D. Shaeffer, Bucyrus, Ohio

Application November 21, 1934, Serial No. 754,115

8 Claims. (Cl. 235—70)

The invention to be hereinafter described relates to slide rules and more particularly to a counter-wheel cooperating therewith and part thereof.

Slide rules of many types and for a wide variety of uses have long been known. Many, as to physical construction are very similar. In fact, the general term by which they are known, clearly demonstrates this. They comprise two members, each graduated, and one movable relatively to the other, the graduations of one being read in cooperation with those of the other, according to the particular purpose for which the rule has been devised. In using these rules, the movable section is slid to the necessary position to give the desired calculation or result, in accordance with the particular system or method applicable to the specific purpose for which that rule has been devised. That result is then either "jotted down" on a "pad" or memorandum sheet and the next one similarly made and similarly entered, or it is "carried mentally" and used with the next one, again, mentally. Or to put it a little differently, each such result of calculation is a separate, complete and finished determination and unrelated to the next, so far as the operation of the rule is concerned. There is no means of "carrying over" one result to the next, mechanically, and automatically combining them by the simple operation of the rule, itself, instead of mentally or by use of a pad or memorandum. The many errors due to "carrying over" mentally are obvious. The same is true, to a lesser extent in the use of a pad or memorandum. Either is, of course, a nuisance, and time wasting compared to any possible simple, easily operated mechanical means. This is particularly noticeable when the determinations are in simple fractions or a wide range of denominations, requiring conversion to the greatest denominator for final determination.

The present invention completely eliminates all of the above objections and difficulties and provides a simple, efficient, compact, economical slide rule by which calculations may be made instantly even in small fractions of the units of the English system of measurements, such as inches, for instance, in combination with a mechanical means for "carrying over" each determination to the next, successively, thereby giving the total as a simple final reading, just as it gives any separate and individual determination, and, without the need of "jotting down" or mentally "carrying over". This scale, also, may be manufactured in large quantities at low cost, and made for use in a great number of industries and fields.

In the present application, a single wide field of use has been selected as illustrative of its ready adaptability and facility of use where a considerable variety of common fractions of a unit are involved, the total result of the series of preliminary determinations amounting to more than one full unit of the measurement. In the present instance, the unit of measure taken has been the inch.

In order to more clearly disclose the construction, operation and use of the invention, reference should be had to the accompanying drawing forming part of the present application.

Throughout the several figures of the drawing, like reference characters designate the same parts in the different views.

In order to avoid possible confusion, the designating numerals of the fractions of the respective scales have been, for the most part, omitted, only a very few at each end being applied or shown. And, in the tabulated or column arrangement of decimal equivalents, on the back of the scale, only the numerator of the common fraction has been shown. In other words, instead of the complete simple fractions 1/64; 2/64; 3/64, etc., 1, 2, 3, etc., are used with the corresponding decimal equivalents. While the top and bottom plan views—Figs. 1 and 2—are approximately full size, the other views are considerably enlarged for clearness. Likewise, for clearness, the sliding clearance between the edges of the sections has been considerably exaggerated, all as will be readily understood.

Figure 1:
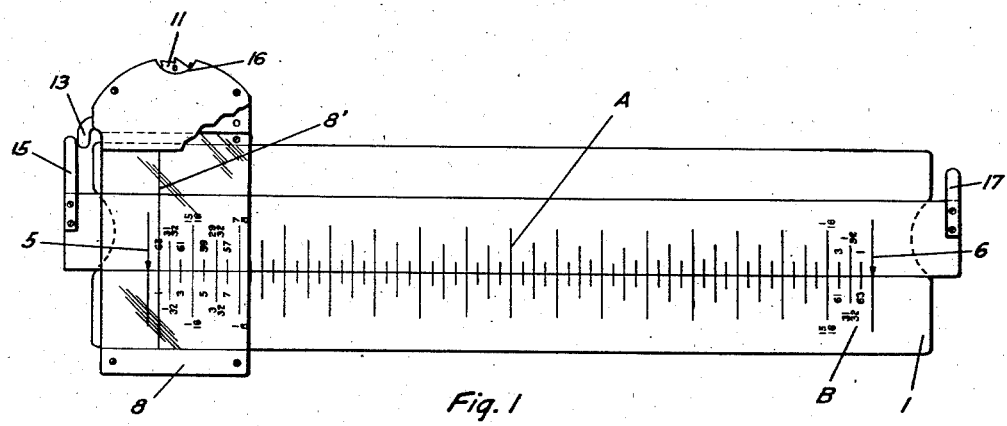
Fig. 1 is a top plan view, with the scales aligned, and the runner in the position just prior to the tripping of the lever.
Figure 2:
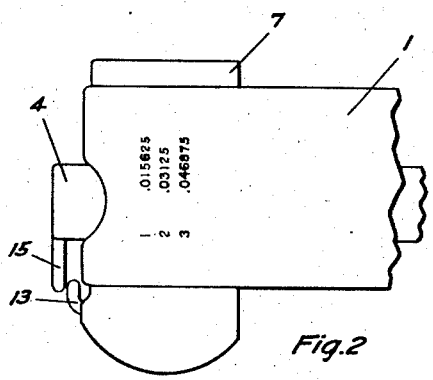
Fig. 2 is a fragmentary bottom plan view.
Figure 3:
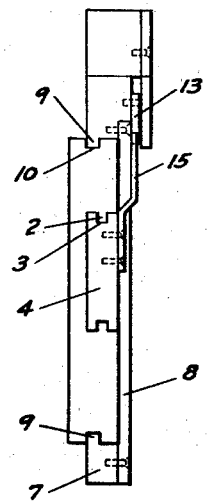
Fig. 3 is an enlarged left hand end view of Fig. 1.
Figure 4:
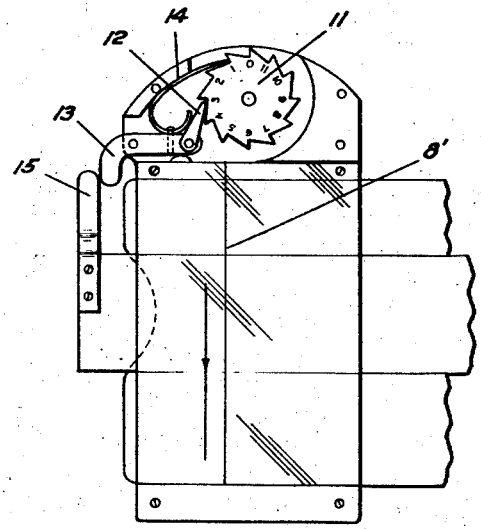
Fig. 4 is an enlarged top plan view of the counter-wheel and cooperating parts, in position in the runner and about to engage the trip.

For purposes of clearly illustrating the invention in its use in one of the English systems of measurements, the lineal inch is here selected. A slide rule is shown in which two members—stationary and slide—each represents one inch and each is divided into all of the generally recognized and used simple and common fractions of an inch, beginning with halves, quarters, eighths, etc. through the sixty-fourths, so that each slide rule member has sixty-four graduations, each graduation representing one sixty-fourth of an inch.

Referring to the drawing in detail, 1 represents the base member or what is usually referred to as the stationary rule, and carries on its face along one inner or channel edge a scale B, representing one lineal inch, divided into sixty-fourths. This base is, preferably, so channeled as to present, in lateral cross section, a very shallow U. Its side walls are provided with ribs 2 to be slidably received in corresponding grooves 3 in the longitudinal edges of the movable member or section 4, which is freely slidably mounted in the channel in the member 1. The slidable member also represents one lineal inch and is similarly graduated on its face along its cooperating edge, with a scale A of sixty-fourths of an inch. But, it will be noticed that the scales A and B are arranged in reverse order, relatively to each other, as to the reading of the graduations. On scale B, the graduations start with 1/64 at the left end and read toward the right to 1", while on scale A, they start at 1/64 at the right and read toward the left to 1". At each end of scale A of the slidable rule section is an indicator arrow 5 or 6, the arrow 5 being at the left and the arrow 6 at the right. These arrows coincide, respectively, with the graduations 1" and 1/64" the distance between which represents exactly 1": And, when at the starting point, as in Fig. 1, with the scales A and B exactly aligned or superposed, these same arrows will also exactly coincide, respectively, with the graduations 1/64" and 1" on scale B.

Now, assume that you wish to add a series of small fractions of an inch totaling less than one inch and all having one or another of the denominations of the scale (A or B) graduations—for example 1/4", 3/8" and 1/16". The total is 15/16". With this scale you simply move slide rule section 4 toward the left until the fraction 3/8 on its scale A is aligned with the fraction 1/4 on scale B of section 1. This is the first step and gives the preliminary or first total addition which appears under the arrow 6 at the right. This is the starting point of the addition. The reading then is 5/8. The next step is to move the slide section 4 from this first or preliminary position toward the right, until the fraction 5/8 on its scale A corresponding to the 5/8 found, is aligned with the next fraction, 1/16, to be added. It will be found that the arrow 6 on scale section 4, at the end of its scale A is aligned with the graduation 15/16 on scale B. That is the correct total. So, briefly, in adding a series of such fractions, totaling less than 1", the user first aligns the rule sections as in Fig. 1, so that the two scales A and B are exactly opposite each other—graduation for graduation—but in reverse order or reading. From this point, he moves section 4 toward the left until the second fraction of the group, read on scale A, falls opposite the first fraction of the group, as read on scale B. This is the first step in the addition. He then reads the fraction on scale B falling directly in line with arrow 6 of section 4. That will be found to be the correct total or sum of the two fractions. He then uses that first or preliminary total as his next fraction, moving the slide section 4 toward the right (from the position of the first addition) until the total or sum of that addition, read as a fraction on scale A, is exactly aligned with the third original fraction of the addition, as read on the scale B. This method is repeated, each time sliding section 4 toward the right until the fraction of its scale corresponding to the last preceding total is exactly aligned with the scale B fraction graduation of the next original fraction of those to be added. The arrow 6 at the right of the scale A always indicates the last or total sum or addition exactly and without a single calculation up to a single unit in the illustrated instance, 1".

On reference to Fig. 1, it will be noticed that when the two sections of the rule are in the positions where the two scales are exactly aligned, the arrow 6 of scale A will be aligned with the 64th or full 1" graduation on scale B—i. e. it will indicate a total addition of 1". That, obviously, is a correct reading, since each of the two sections represents one inch, but only one, entire lineal inch. So, the two, arranged side by side (neither extended beyond the other) represent exactly the same length—1". Now, assume that section 4 is moved to the other extreme, so that arrow 6 of scale A falls opposite the first graduation of the scale B. The reading then is zero. Scale A reads reversely to scale B. So, when scale A has been moved its full length to the left, relatively to scale B, it is as though zero had been added to zero, or 1" had been subtracted from 1"—each scale reading cancels the other. From that point, every time the scale A is moved toward the right, a fraction of an inch corresponding to that distance is added, and, obviously, each successive total is instantly indicated by the arrow 6, on scale B. Likewise, each total indicated by the arrow 6 may be considered as a previous total plus the fraction representing the distance traveled by section 4 in moving from such previous total to the present total indicated by the arrow. And so, any total up to one full inch may be mentally resolved into any desired corresponding number of small fractions and the additions made as previously explained, the arrow 6 faithfully indicating every successive intermediate addition as it occurs, so that there is no need to "carry over" or "jot down" any figures or make any calculations. Every total is instantly and accurately shown as soon as made.

Freely slidably mounted on the stationary member 1 is a runner 7 with transparent plate 8, having a hair line 8'. In use, this runner more or less "marks the place" as a book marker does between the leaves of a book. For instance, in the example given, when the slide rule section has been moved from the original position to the position of the first preliminary addition resulting in the total fraction 5/8, the runner will be slid along the base 1 until the hair line 8' is directly over the arrow 6 and its reading of 5/8. It will be left there while the slide rule section is moved to bring that total (5/8) over the next fraction 1/16 on the base section 1. So, the user may stop at any stage of the series of additions, set the runner on the sum then indicated, and continue on from that point at any later time. He will not have to "start all over again". It is slidably mounted on the member 1 in any usual and well known manner, as by ribs 9, sliding freely in cooperating grooves 10 in the outer edges of the member 1. As will be readily understood, the sliding section 4 travels freely beneath the runner. The runner is maintained in any of its positions by a slight binding or friction of a leaf spring or the like in usual and well known manner.

Now, assume that it is desired to add fractions totalling over one unit. For instance, to the 1⅛ previously determined, we wish to add 3/32. The total, of course, is 1 5/32. The addition is made in the same way—i. e. the slide section 4 is moved to bring its graduation 1⅛ above the 3/32 graduation of the scale B of section 1, the arrow 5, at the left will then point to the total on scale B, which will be 1 5/32, the 1 being shown as plus 1 (on scale A), or one whole unit more than the fraction. The slide section 4 will have moved its entire length plus 5/32 toward the right from the zero position. But suppose that the totals exceed two whole units. In that case, not even the plus 1 indication on the slide section 4 will help. So, to provide for all cases where the addition totals over one unit, a counter-wheel has been provided, which automatically indicates and accurately adds every whole unit as it results, in the addition. It comprises a ratchet wheel 11 journaled in the runner, so that its circumference just completely clears the adjacent edge of the base section 1. It is adapted to be actuated by a pawl 12 pivotally mounted in the inner end of a rocker arm or lever 13 which is pivoted in the runner. A small leaf spring 14, suitably carried by the lever 13 in any usual and well known manner and confined between the lever and an adjacent wall of the runner, serves to return the lever to inoperative position instantly after every operation of it. This same spring is extended so that one branch or portion engages the free end of pawl 12 and maintains it in engagement with the teeth of the ratchet or counter-wheel 11. Needless to say, the ratchet wheel is mounted with sufficient friction to avoid reverse rotation by the drag of the pawl. Or, as will be readily understood, a small separate, pivoted and spring controlled dog may be used, or any other well known means. The free end of lever 13 projects beyond the runner and into the path of a trip 15 carried by the left hand end of the slide section 4. So, as runner 7 is moved to carry the hair line 8' over the arrow 5 it will bring lever 13 into tripping engagement with trip 15, thereby rotating the counter-wheel 11 one notch or step. Each step or partial rotation represents one whole unit. The face of the counter-wheel, adjacent the notches, is provided with a corresponding scale. In the present instance, the wheel may be provided with the 12 numbers corresponding with the number of inches in one foot, or it may have 36 to correspond with the number of inches in one yard, or a simple multiplying device may be used for the same purpose, in usual and well known manner.

Now, assume that it is desired to add the group of fractions totaling 1 5/32 inches, as previously stated. The operation is carried out as there stated, to and including the last total of less than one inch. Then the runner is moved to the left until the hair line 8' is above the arrow 5 of section 4 and the aligned fraction 3/32 of scale B. The trip 15 is so positioned relatively to the arrow 5 as to engage and actuate the lever 13 as the hair line 8' of the runner approaches the arrow 5. And, of course, as will be clear on reference to the drawing, as the lever end passes over the trip in the return direction, the lever will simply rock the pawl 12 back into position to engage the next tooth. The upper edge of the runner is cut away as at 16 so that the total added units will always appear for reading.

In the above example totalling 1 5/32 inches, after actuating the counterwheel, the fraction 3/32 over the unit, is treated as the first fraction of the following addition and the first procedure is followed, or, in other words, suppose ¼ is to be added thereto, the upper slide section 4 will be moved to the left until the fraction ¼ on its scale A is alined with fraction 3/32 on scale B. The arrow 6 at the right end of scale A will then be alined with fraction 3/32 on scale B which is the correct total of the fractions, less than one unit. The one unit is shown on the counter-wheel 11 through the opening 16. And so, every time a total exceeds one unit, the runner is moved toward the left until the hair line 8' overlies the arrow 5, at the left of scale A, thereby adding and indicating that unit.

For ease and quickness in positioning the hair line 8' over the arrow 6 for marking any preliminary or final sum, a stop 17 is provided. This stop is so spaced from the arrow 6 as to just engage the adjacent edge of the runner as the hair line 8' falls above arrow 6. By such an arrangement no time is lost in accurately positioning the hair line. The runner is simply slid along the rule until it engages stop 17 and must, necessarily, fall in exactly the right position without further adjustment. There is no tripping or other action by the stop 17. It acts solely to accurately position the runner. As a matter of convenience, either the back of the rule or a portion of the face may be provided with the decimal equivalents for the successive sixty-fourth of an inch, for ready reference. That is a real convenience in many ways and cases for quickly converting any common fraction of the slide rule to the equivalent decimal fraction, avoiding the necessity of looking up tables or relying on memory.

While a single simple example of addition has been used and a two-part rule, each part with cooperating English scale has been shown, it will be understood that many changes may be made in the construction, arrangement and disposition of the various parts of the invention and in its application, within the scope of the appended claims, without in any degree departing from the field of this invention, and it is meant to include all such within this application.

It is believed that the construction, operation and use of the invention will be clear from the preceding detailed description.

Having thus described my invention, what I claim and desire to protect by Letters Patent is:—

1. In combination in a slide rule, a base section having a scale thereon, a section slidable relatively to said base section and having a scale, a runner carried on said base section, a counter-wheel carried by said runner and adapted to indicate units of measurement of said rule, and means carried by one of said sections engaging and operating devices actuating said counter-wheel when one of said sections is moved a predetermined distance relatively to the other section.

2. In combination in a slide rule, a base section having a scale thereon, a section slidable relatively to said base section and having a scale, a runner carried on said base section, a counter-wheel carried by said runner and adapted to indicate units of measurement of said rule, and means carried by said slidable section and actuating said wheel as the runner reaches a predetermined position relatively to said slidable section.

3. In combination in a slide rule, a base section having a scale thereon, a section slidable relatively to said base section and having a scale, a runner carried on one of said sections, a counter-wheel carried by said runner and adapted to indicate units of measurement of said scale, means carried by said slidable section and actuating said wheel as the runner reaches a predetermined position relatively to said slidable section, and means carried by said slidable section and adapted to engage and accurately position the aforesaid runner at predetermined graduations of the aforesaid section.

4. In combination in a slide rule, a base section having a scale thereon, a section slidable relatively thereto and having a scale thereon, a runner carried on said base section, a counter-wheel carried on said runner and adapted to indicate units of measurement of said rule, a pawl for operating said wheel, an actuating lever carrying said pawl, and means carried by said slidable section and engaging and operating said lever as said runner reaches a predetermined point.

5. In combination in a slide rule, a base section having a scale thereon, a section slidable relatively to said base section and having a scale, a runner carried on said base section, a counter-wheel carried by said runner and adapted to indicate values, each equal to that represented by the length of each of the aforesaid scales, a pawl for operating said wheel, an actuating lever pivotally carrying said pawl, means for yieldingly maintaining said pawl in operative engagement with said counter-wheel, and a trip carried by the aforesaid slidable section and engaging and actuating said lever as the aforesaid runner reaches a predetermined position relatively to the aforesaid slidable section.

6. In combination in a slide rule, a base section having a scale thereon, a section slidable relatively thereto and having a scale, a counter wheel, and means actuated by said slidable section and operating said counter wheel.

7. In combination in a slide rule, a base section having a scale thereon, a section slidable relatively to said base section and having a scale, a counter wheel, a trip carried by said slidable section, and a counter-wheel operating lever actuated by said trip.

8. A slide rule comprising a base section having a scale thereon, a section slidable relatively to said base section and having a scale, a runner slidably mounted on said base section, counter wheel carried by said runner and adapted to indicate complete units, a trip carried by said slidable section and a counter wheel operating lever actuated by said trip every time that the slidable section reaches a predetermined position.

GEORGE D. SHAEFFER.